(12) United States Patent
Li et al.

(10) Patent No.: US 8,807,799 B2
(45) Date of Patent: Aug. 19, 2014

(54) LED-BASED LAMPS

(75) Inventors: Yi-Qun Li, Danville, CA (US); Ian Collier, Hayward (GB)

(73) Assignee: Intematix Corporation, Fremont, CA (US)

(*) Notice: Subject to any disclaimer, the term of this patent is extended or adjusted under 35 U.S.C. 154(b) by 7 days.

(21) Appl. No.: 13/156,197

(22) Filed: Jun. 8, 2011

(65) Prior Publication Data

US 2012/0147624 A1    Jun. 14, 2012

Related U.S. Application Data

(60) Provisional application No. 61/354,068, filed on Jun. 11, 2010.

(51) Int. Cl.
| | | |
|---|---|---|
| *F21V 7/00* | (2006.01) | |
| *F21K 99/00* | (2010.01) | |
| *F21V 29/00* | (2006.01) | |
| *F21V 7/20* | (2006.01) | |
| *F21V 3/04* | (2006.01) | |
| *F21V 7/06* | (2006.01) | |
| *F21W 121/00* | (2006.01) | |
| *F21V 7/22* | (2006.01) | |
| *F21Y 101/02* | (2006.01) | |

(52) U.S. Cl.
CPC ............ *F21V 7/0008* (2013.01); *F21V 7/20* (2013.01); *F21K 9/56* (2013.01); *F21V 29/2231* (2013.01); *F21K 9/135* (2013.01); *F21K 9/52* (2013.01); *G02B 6/0008* (2013.01); *F21V 7/0025* (2013.01); *F21V 3/0481* (2013.01); *F21V 7/06* (2013.01); *F21V 3/0463* (2013.01); *F21K 9/137* (2013.01); *F21W 2121/00* (2013.01); *F21V 7/22* (2013.01); *G02B 6/0003* (2013.01); *F21Y 2101/02* (2013.01)
USPC ............................ 362/299; 362/555; 362/231

(58) Field of Classification Search
USPC .............. 362/231, 240.241, 245, 247, 293, 362/296.01, 296.07, 296.08, 298, 299, 302, 362/310, 311.01, 311.02, 311.09, 326, 331, 362/332, 334, 346, 516, 520, 521, 551, 545, 362/555, 800, 249.01, 249.02
See application file for complete search history.

(56) References Cited

U.S. PATENT DOCUMENTS 3,290,255 A    12/1966    Smith, I.
3,593,055 A    7/1971     Geusic et al.
(Continued)

FOREIGN PATENT DOCUMENTS

CN    1349066 A    5/2002
CN    1425117 A    6/2003
(Continued)

OTHER PUBLICATIONS

Chinese Office Action and English Translation dated Dec. 19, 2011 for Chinese Appln. No. 200780051259.7.

(Continued)

*Primary Examiner* — Hargobind S Sawhney
(74) *Attorney, Agent, or Firm* — Vista IP Law Group, LLP

(57) ABSTRACT

A lamp comprises: a dish-shaped (parabolic); an LED operable to generate excitation light; a light guide configured to extend along an axis of the reflector, wherein light generated by the at least one LED is coupled into a first end of the light guide and wherein light is emitted from the light guide at a light emitting surface that is in proximity to a second end of the light guide and at least one phosphor material provided as a layer on at least a part of the light emitting surface of the light guide. An LED light bulb is also disclosed.

16 Claims, 8 Drawing Sheets

US 8,807,799 B2

Page 2

(56) References Cited

U.S. PATENT DOCUMENTS

| | | | |
|---|---|---|---|
| 3,670,193 A | 6/1972 | Thorington et al. | |
| 3,676,668 A | 7/1972 | Collins et al. | |
| 3,691,482 A | 9/1972 | Pinnow et al. | |
| 3,709,685 A | 1/1973 | Hercock et al. | |
| 3,743,833 A | 7/1973 | Martic et al. | |
| 3,763,405 A | 10/1973 | Mitsuhata | |
| 3,793,046 A | 2/1974 | Wanmaker et al. | |
| 3,819,973 A | 6/1974 | Hosford | |
| 3,819,974 A | 6/1974 | Stevenson et al. | |
| 3,849,707 A | 11/1974 | Braslau et al. | |
| 3,875,456 A | 4/1975 | Kana et al. | |
| 3,932,881 A | 1/1976 | Mita et al. | |
| 3,937,998 A | 2/1976 | Verstegen et al. | |
| 3,972,717 A | 8/1976 | Wiedemann | |
| 4,047,075 A | 9/1977 | Schober! | |
| 4,081,764 A | 3/1978 | Christmann et al. | |
| 4,084,215 A * | 4/1978 | Willenbrock | 362/470 |
| 4,104,076 A | 8/1978 | Pons | |
| 4,143,394 A | 3/1979 | Schoberl | |
| 4,176,294 A | 11/1979 | Thornton, Jr. | |
| 4,176,299 A | 11/1979 | Thornton | |
| 4,211,955 A | 7/1980 | Ray | |
| 4,234,907 A | 11/1980 | Daniel | |
| 4,305,019 A | 12/1981 | Graff et al. | |
| 4,315,192 A | 2/1982 | Skwirut et al. | |
| 4,443,532 A | 4/1984 | Joy et al. | |
| 4,506,194 A * | 3/1985 | Rigden et al. | 315/200 R |
| 4,559,470 A | 12/1985 | Murakami et al. | |
| 4,573,766 A | 3/1986 | Bournay, Jr. et al. | |
| 4,618,555 A | 10/1986 | Suzuki et al. | |
| 4,638,214 A | 1/1987 | Beers et al. | |
| 4,667,036 A | 5/1987 | Iden et al. | |
| 4,678,285 A | 7/1987 | Ohta et al. | |
| 4,727,003 A | 2/1988 | Ohseto et al. | |
| 4,772,885 A | 9/1988 | Uehara et al. | |
| 4,845,223 A | 7/1989 | Seybold et al. | |
| 4,859,539 A | 8/1989 | Tomko et al. | |
| 4,915,478 A | 4/1990 | Lenko et al. | |
| 4,918,497 A | 4/1990 | Edmond | |
| 4,920,469 A * | 4/1990 | Harding | 362/300 |
| 4,946,621 A | 8/1990 | Fouassier et al. | |
| 4,992,704 A | 2/1991 | Stinson | |
| 5,077,161 A | 12/1991 | Law | |
| 5,110,931 A | 5/1992 | Dietz et al. | |
| 5,126,214 A | 6/1992 | Tokailin et al. | |
| 5,131,916 A | 7/1992 | Eichenauer et al. | |
| 5,134,550 A * | 7/1992 | Young | 362/560 |
| 5,143,433 A | 9/1992 | Farrell | |
| 5,143,438 A | 9/1992 | Giddens et al. | |
| 5,166,761 A | 11/1992 | Olson et al. | |
| 5,208,462 A | 5/1993 | O'Connor et al. | |
| 5,210,051 A | 5/1993 | Carter, Jr. | |
| 5,211,467 A | 5/1993 | Seder | |
| 5,237,182 A | 8/1993 | Kitagawa et al. | |
| 5,264,034 A | 11/1993 | Dietz et al. | |
| 5,278,731 A * | 1/1994 | Davenport et al. | 362/551 |
| 5,283,425 A | 2/1994 | Imamura | |
| 5,369,289 A | 11/1994 | Tamaki et al. | |
| 5,405,709 A | 4/1995 | Littman et al. | |
| 5,439,971 A | 8/1995 | Hyche | |
| 5,518,808 A | 5/1996 | Bruno et al. | |
| 5,535,230 A | 7/1996 | Abe | |
| 5,557,168 A | 9/1996 | Nakajima et al. | |
| 5,563,621 A | 10/1996 | Silsby | |
| 5,578,839 A | 11/1996 | Nakamura et al. | |
| 5,583,349 A | 12/1996 | Norman et al. | |
| 5,585,640 A | 12/1996 | Huston et al. | |
| 5,619,356 A | 4/1997 | Kozo et al. | |
| 5,660,461 A | 8/1997 | Ignatius et al. | |
| 5,677,417 A | 10/1997 | Muellen et al. | |
| 5,679,152 A | 10/1997 | Tischler et al. | |
| 5,763,901 A | 6/1998 | Komoto et al. | |
| 5,770,887 A | 6/1998 | Tadatomo et al. | |
| 5,771,039 A | 6/1998 | Ditzik | |
| 5,777,350 A | 7/1998 | Nakamura et al. | |
| 5,869,199 A | 2/1999 | Kido | |
| 5,959,316 A | 9/1999 | Lowery | |
| 5,962,971 A | 10/1999 | Chen | |
| 5,998,925 A | 12/1999 | Shimizu | |
| 6,137,217 A | 10/2000 | Pappalardo et al. | |
| 6,288,700 B1 | 9/2001 | Mori | |
| 6,299,338 B1 | 10/2001 | Levinson et al. | |
| 6,340,824 B1 | 1/2002 | Komoto et al. | |
| 6,350,041 B1 * | 2/2002 | Tarsa et al. | 362/231 |
| 6,490,402 B1 | 12/2002 | Ota | |
| 6,504,301 B1 | 1/2003 | Lowery | |
| 6,533,446 B2 * | 3/2003 | Chen et al. | 362/559 |
| 6,576,488 B2 | 6/2003 | Collins et al. | |
| 6,600,175 B1 | 7/2003 | Baretz et al. | |
| 6,636,686 B1 | 10/2003 | Belfer | |
| 6,642,618 B2 | 11/2003 | Yagi et al. | |
| 6,642,652 B2 | 11/2003 | Collins et al. | |
| 6,758,582 B1 * | 7/2004 | Hsiao et al. | 362/302 |
| 6,814,470 B2 * | 11/2004 | Rizkin et al. | 362/327 |
| 6,843,590 B2 | 1/2005 | Jones et al. | |
| 6,851,834 B2 * | 2/2005 | Leysath | 362/303 |
| 6,854,865 B2 * | 2/2005 | Probst et al. | 362/341 |
| 6,869,812 B1 | 3/2005 | Liu | |
| 6,893,140 B2 * | 5/2005 | Storey et al. | 362/191 |
| 6,917,751 B2 | 7/2005 | Wang et al. | |
| 6,921,920 B2 | 7/2005 | Kazakevich | |
| 7,083,315 B2 * | 8/2006 | Hansler et al. | 362/559 |
| 7,153,015 B2 | 12/2006 | 8rukilacchio | |
| 7,277,618 B2 | 10/2007 | Yamazaki et al. | |
| 7,311,858 B2 | 12/2007 | Wang | |
| 7,390,437 B2 | 6/2008 | Dong | |
| 7,425,084 B2 * | 9/2008 | Ruud et al. | 362/298 |
| 7,479,662 B2 | 1/2009 | Soules et al. | |
| 7,505,655 B2 | 3/2009 | Yamazaki et al. | |
| 7,506,986 B2 * | 3/2009 | Koba et al. | 353/119 |
| 7,540,616 B2 * | 6/2009 | Conner | 353/20 |
| 7,541,728 B2 | 6/2009 | Wang | |
| 7,575,697 B2 | 8/2009 | Li | |
| 7,601,276 B2 | 10/2009 | Li | |
| 7,615,795 B2 | 11/2009 | Baretz et al. | |
| 7,628,513 B2 | 12/2009 | Chiu | |
| 7,648,650 B2 | 1/2010 | Liu | |
| 7,655,156 B2 | 2/2010 | Cheng | |
| 7,762,701 B2 * | 7/2010 | Luo et al. | 362/545 |
| 7,937,865 B2 | 5/2011 | Li et al. | |
| 7,943,945 B2 | 5/2011 | Baretz et al. | |
| 7,955,878 B2 * | 6/2011 | Harada | 438/27 |
| 7,976,206 B2 * | 7/2011 | Wu et al. | 362/555 |
| 8,083,364 B2 * | 12/2011 | Allen | 362/84 |
| 8,128,267 B2 * | 3/2012 | Sormani et al. | 362/555 |
| 8,193,702 B2 * | 6/2012 | Lenk et al. | 313/506 |
| 8,258,524 B2 * | 9/2012 | Tan et al. | 257/95 |
| 2003/0042493 A1 | 3/2003 | Kazakevich | |
| 2004/0016938 A1 | 1/2004 | Baretz et al. | |
| 2005/0116597 A1 * | 6/2005 | Hsu | 313/113 |
| 2005/0219171 A1 | 10/2005 | Gimbutas | |
| 2005/0225988 A1 * | 10/2005 | Chaves et al. | 362/332 |
| 2006/0012984 A1 | 1/2006 | Coushaine et al. | |
| 2006/0049416 A1 | 3/2006 | Baretz et al. | |
| 2006/0235277 A1 | 10/2006 | Ohkubo et al. | |
| 2007/0145397 A1 | 6/2007 | Denbaars et al. | |
| 2007/0279908 A1 * | 12/2007 | Alcelik | 362/283 |
| 2007/0297190 A1 | 12/2007 | Ng | |
| 2008/0049317 A1 | 2/2008 | Hara et al. | |
| 2008/0075406 A1 | 3/2008 | Kadomi et al. | |
| 2008/0158907 A1 | 7/2008 | Lin et al. | |
| 2008/0224597 A1 | 9/2008 | Baretz et al. | |
| 2008/0224598 A1 | 9/2008 | Baretz et al. | |
| 2008/0262316 A1 | 10/2008 | Ajima et al. | |
| 2009/0039756 A1 | 2/2009 | Yamamoto | |
| 2009/0059359 A1 | 3/2009 | Nahm et al. | |
| 2009/0067194 A1 | 3/2009 | Sanchez | |
| 2009/0140630 A1 | 6/2009 | Kijima et al. | |
| 2009/0251884 A1 | 10/2009 | Rains | |
| 2010/0002444 A1 * | 1/2010 | Konaka | 362/294 |
| 2010/0085737 A1 * | 4/2010 | Yang | 362/101 |
| 2010/0149815 A1 | 6/2010 | Erchak | |
| 2010/0237760 A1 | 9/2010 | Yang | |
| 2010/0308712 A1 | 12/2010 | Liu et al. | |

(56) References Cited

U.S. PATENT DOCUMENTS

| | | | | |
|---|---|---|---|---|
| 2011/0006334 | A1* | 1/2011 | Ishii et al. | 257/98 |
| 2011/0299284 | A1* | 12/2011 | Van De Ven et al. | 362/293 |
| 2012/0140466 | A1* | 6/2012 | Yang et al. | 362/235 |

FOREIGN PATENT DOCUMENTS

| | | |
|---|---|---|
| EP | 1712165 A2 | 10/2006 |
| GB | 2 017 409 | 10/1979 |
| JP | S50-79379 | 11/1973 |
| JP | 60170194 | 9/1985 |
| JP | 862-189770 | 8/1987 |
| JP | H01-1794 71 | 7/1989 |
| JP | 01-260707 | 10/1989 |
| JP | H02-91980 | 3/1990 |
| JP | H3-24692 | 3/1991 |
| JP | 4010665 | 1/1992 |
| JP | 4010666 | 1/1992 |
| JP | 04-289691 | 10/1992 |
| JP | 4-321280 | 11/1992 |
| JP | 05-152609 | 6/1993 |
| JP | 6207170 | 7/1994 |
| JP | 6-267301 | 9/1994 |
| JP | 6283755 | 10/1994 |
| JP | 07-099345 | 4/1995 |
| JP | H07-176794 | 7/1995 |
| JP | 07-235207 | 9/1995 |
| JP | H7-282609 | 10/1995 |
| JP | H08-7614 | 1/1996 |
| JP | 8-250281 | 9/1996 |
| JP | 2900928 | 3/1999 |
| JP | 2000275444 A | 10/2000 |
| JP | 2003515899 A | 5/2003 |
| JP | 2003162904 A | 6/2003 |
| JP | P2003-234513 | 8/2003 |
| JP | 2005150001 A | 11/2003 |
| JP | 2004229273 A | 8/2004 |
| JP | 2004287067 A | 10/2004 |
| JP | P3724490 | 9/2005 |
| JP | P3724498 | 9/2005 |
| JP | 2006037323 A | 2/2006 |
| JP | 2006-244779 | 9/2006 |
| JP | 2006253099 A | 9/2006 |
| JP | 2007155820 A | 6/2007 |
| KR | 10-0757762 B | 9/2007 |
| KR | 10-2010-0033141 A | 3/2010 |
| TW | M253789 | 12/2004 |
| TW | M272411 | 8/2005 |
| TW | 200617449 | 6/2006 |
| WO | WO 9108508 | 6/1991 |
| WO | WO 2004099664 A1 | 11/2004 |
| WO | WO 2005101070 A1 | 10/2005 |
| WO | WO 2006007283 | 1/2006 |
| WO | WO 2006011571 A1 | 2/2006 |
| WO | WO 2006131924 A2 | 12/2006 |

OTHER PUBLICATIONS

Chinese Office Action and English Translation dated Jun. 11, 2010 for Chinese Appln. No. 200780051259.7.
Chinese Office Action and English Translation dated Oct. 8, 2012 for Chinese Appln. No. 200780051259.7.
Chinese Office Action and English Translation dated May 11, 2012 for Chinese Appln. No. 201010593209.5.
Japanese Office Action and English Translation dated Feb. 21, 2012 for Japanese Appln. No. 2009-549567.
Japanese Office Action and English Translation dated Jun. 19, 2012 for Japanese Appln. No. 2009-549567.
Taiwanese Office Action and English Translation and Search Report dated Jul. 23, 2010 for Taiwanese Appln. No. 96130925.
Taiwanese Office Action and English Translation dated Apr. 28, 2011 for Taiwanese Appln. No. 096130925.
Final Office Action dated Jul. 21, 2011 for U.S. Appl. No. 11/827,890.
Final Office Action dated May 27, 2010 for U.S. Appl. No. 11/827,890.
Non-Final Office Action dated Jun. 12, 2008 for U.S. Appl. No. 11/827,890.
Non-Final Office Action dated Nov. 15, 2011 for U.S. Appl. No. 11/827,890.
Non-Final Office Action dated Nov. 29, 2010 for U.S. Appl. No. 11/827,890.
Non-Final Office Action dated Sep. 24, 2009 for U.S. Appl. No. 11/827,890.
Notice of Allowance dated Jul. 25, 2012 for U.S. Appl. No. 11/827,890.
Non-Final Office Action dated Feb. 19, 2013 for U.S. Appl. No. 12/726,194.
Non-Final Office Action dated Oct. 7, 2011 for U.S. Appl. No. 12/726,194.
Non-Final Office Action dated Jul. 24, 2012 for U.S. Appl. No. 12/726,194.
Final Office Action dated Aug. 1, 2012 for U.S. Appl. No. 12/726,201.
Non-Final Office Action dated Oct. 11, 2011 for U.S. Appl. No. 12/726,201.
Notice of Allowance dated Dec. 28, 2012 for U.S. Appl. No. 12/726,201.
International Search Report and Written Opinion dated Jul. 28, 2008 for International PCT Application No. PCT/US07/16128, 15 pages.
International Search Report and Written Opinion dated Sep. 28, 2011 for International PCT Application No. PCT/US11/39862, 9 pages.
Office Action dated Apr. 17, 2014 for Korean Appln. No. 10-2009-7018970.
Foreign Office Action dated Mar. 30, 2014 for Korean Appln. No. 10-2012-7034185.
Foreign Office Action dated Jun. 10 2014 for Japanese Appln. No. 2013-140602.
Foreign Office Action dated Mar. 5, 2013 for Japanese Appln. No. 2009-549567.
Foreign Office Action dated Jun. 13, 2013 for Chinese Appln. No. 200780051259.7.
Chinese Office Action and English Translation dated Aug. 19, 2013 for Chinese Appln. No. 201010593209.5.
Notice of Allowance dated Sep. 3, 2013 for U.S. Appl. No. 12/726,194.
Office Action dated Oct. 16, 2013 for Korean Appln. No. 10-2009-7018970.
Foreign Office Action dated Nov. 11, 2013 for Chinese Appln. No. 201180034338.3.
Foreign Office Action dated Nov. 21, 2013 for Chinese Appln. No. 200780051259.7.
"Fraunhofer-Gesellschafl: Research News Special1997", http://www.fhg.de/press/md-e/md1997/sondert2.hlm,(accessed on Jul. 23, 1998), Jan. 1997, Publisher: Fraunhofer Institute.
Adachi, C. et al., "Blue light-emitting organic electroluminescent devices", "Appl. Phys. Lett.", Feb. 26, 1990, pp. 799-801, vol. 56, No. 9.
Akasaki, Isamu, et al., "Photoluminescence of Mg-doped p-type GaN and electroluminescence of GaN p-n junction LED", "Journal of Luminescence", Jan.-Feb. 1991, pp. 666-670, vol. 48-49 pt. 2.
Amano, H., et al., "UV and blue electroluminescence from Al/GaN:Mg/GaN LED treated with low-energy electron beam irradiation (LEEBI)", "Institute of Physics: Conference Series", 1990, pp. 725-730, vol. 106, No. 10.
Apr. 14, 2010 Office Action in U.S. Patent Application No. 11/264,124, issued by Examiner Abu I Kalam (Art Unit 2814).
Apr. 15, 2009 Office Action in U.S. Appl. No. 11/264.124, issued by Abu I Kalam.
Armaroli, N. et al., "Supramolecular Photochemistry and Photophysics. ", "J. Am. Chern. Soc.", 1994, pp. 5211-5217, vol. 116.
Aug. 21, 2006 Office Action in U.S. Appl. No. 10/623,198, issued by Thao X. Le.
Aug. 24, 2007 Office Action in U.S. Appl. No. 11/264,124, issued by Thao X. Le.

(56) References Cited

OTHER PUBLICATIONS

Aug. 26, 2010 Office Action in U.S. Appl. No. 12/131,118.
Berggren, M. et al., "Light-emitting diodes with variable colours from polymer blends", "Nature", Dec. 1, 1994, pp. 444-446, vol. 372.
Berggren, M., et al., "White light from an electroluminescent diode made from poly[3(4-octylphenyl)-2,2'-bithiophene] and an oxadiazole . . . ", "Journal of Applied Physics", Dec. 1994, pp. 7530-7534, vol. 76, No. 11.
Boonkosum, W. et al., "Novel Flat Panel display made of amorphous SiN:H/SiC:H thin film LED", "Physical Concepts and Materials for Novel Optoelectronic Device Applications II", 1993, pp. 40-51, vol. 1985.
Bradfield, P.L., et al., "Electroluminescence from sulfur impurities in a p-n junction formed in epitaxial silicon", "Appl. Phys. Lett", 07110/1989, Page(s).10D-102, vol. 55, No. 2.
Chao, Zhang Jin, et al., "White light emitting glasses", "Journal of Solid State Chemistry", 1991, pp. 1729, vol. 93.
Comrie, M. , "Full Color LED Added to Lumex's Lineup", "EBN", Jun. 19, 1995, p. 28.
CRC Handbook, 63rd Ed., (1983) p. E-201.
Das, N.C., et al., "Luminescence spectra of ann-channel metal-oxide-semiconductor field-effect transistor at breakdown", 1990, pp. 1152-1153, vol. 56, No. 12.
Dec. 16. 2004 Office Action in U.S. Appl. No. 10/623,198, issued by Thao X. Le.
Dictionary Definition of Phosphor, Oxford English Dictionary Online, Mar. 9, 2012 (Only partial available due to corrupt file as provided on Mar. 22, 2012 in U.S. Appl. No. 12/131,119; Request for Full Reference filed).
El Jouhari, N., et al., "White light generation using fluorescent glasses activated by Ce3+, Tb3+ and Mn2+ ions", "Journal De Physique IV, Colloque C2", Oct. 1992, pp. 257-260, vol. 2.
Feb. 21, 2012 Office Action in U.S. Appl. No. 12/131,118, issued by Abul Kalam.
Feb. 26, 2008 Office Action in U.S. Appl. No. 11/264,124, issued by Abu I Kalam.
Feb. 4, 2005 Office Action in U.S. Appl. No. 10/623,198, issued by Thao X. Le.
Feb. 7, 2007 Office Action in U.S. Appl. No. 11/264,124, issued by Thao X. Le.
Forrest, S. et al. , "Organic emitters promise a new generation of displays", "Laser Focus World ", Feb. 1995, pp. 99-107.
Hamada, Y. et al. , "Blue-Light-Emitting Organic Electroluminescent Devices with Oxadiazole Dimer Dyes as an Emitter", "Jpn. J. Appl. Physics", Jun. 1992, pp. 1812-1816, vol. 31.
Hamakawa, Yoshihiro, et al., "Toward a visible light display by amorphous SiC:H alloy system", "Optoelectronics—Devices and Technologies", Dec. 1989, pp. 281-294, vol. 4, No. 2.
Hirano, Masao, et al., "Various performances of fiber-optical temperature sensor utilizing infrared-to-visible conversion phosphor", "Electrochemisty (JP)", Feb. 1987, pp. 158-164, vol. 55, No. 2, Publisher: Electrochemical Society of Japan.
Jang, S., "Effect of Avalanche-Induced Light Emission on the Multiplication Factor in Bipolar Junction Transistors", "Solid-State Electronics", 1991, pp. 1191-1196, vol. 34, No. 11.
Jan. 29, 2007 Office Action in U.S. Appl. No. 10/623,198, issued by Thao X. Le.
Jan. 30, 2006 Office Action in U.S. Appl. No. 11/264,124, issued by Thao X. Le.
Jan. 7, 2011 Office Action in U.S. Appl. No. 12/131,119, issued by Steven Y. Horikoshi.
Jul. 10, 2008 Office Action in U.S. Appl. No. 11/264,124, issued by Abu I Kalam.
Jul. 14, 2005 Notice of Allowance, Notice of Allowability, and Examiners Statement of Reasons for Allowance in U.S. Appl. No. 10/623,198, issued by Thao X. Le.
Jul. 14, 2011 Office Action in U.S. Appl. No. 12/131,119, issued by Steve Horikoshi.
Jul. 7, 2011 Office Action in U.S. Appl. No. 12/131,118, issued by Abu I Kalam.
Jun. 14, 2006 Office Action in U.S. Appl. No. 11/264,124, issued by Thao X. Le.
Jun. 26, 2007 Office Action in U.S. Appl. No. 10/623,198, issued by Thao X. Le.
Kido, J. et al. , "1,2,4-Triazole Derivative as an Electron Transport Layer in Organic Luminescent Devices", "Jpn. J. Appl. Phys. ", Jul. 1, 1993, pp. L917-L920, vol. 32.
Kido, J. et al. , "Bright blue electroluminescence from poly(N-vinylcarbazole)", "Appl. Phys. Letters", Nov. 8, 1993, pp. 2627-2629, vol. 63, No. 19.
Kido, J., et al., "White light-emitting organic electroluminescent devices using the poly(N-vinylcarbazole) emitter layer doped with . . . ", "Appl. Phys. Lett.", Feb. 14, 1994, pp. 815-817, vol. 64, No. 7.
Krames, M., et al., "Status and Future of High-Power Light-Emitting Diodes for Solid-Slate Lighting", "Journal of Display Technology", Jun. 2007, pp. 160-175, vol. 3, No. 2.
Kudryashov, V., et al., "Spectra of Superbright Blue and Green InGaN/AlGaN/GaN Light-Emitting diodes", "Journal of the European Ceramic Society", May 1996, pp. 2033-2037, vol. 17.
Larach, S., et al., "Blue emitting luminescent phosphors: Review and status", "Int'l Workshop on Electroluminescence", 1990, pp. 137-143.
LEDs and Laser Diodes, Electus Distribution, copyright 2001, available at URL:http://www.jaycar.com.au/images_uploaded/ledlaser.Pdf.
Lester, S., et al., "High dislocation densities in high efficiency GaN-based light-emitting diodes", "Appl. Phys. Lett.", Mar. 6, 1995, pp. 1249-1251, vol. 66, No. 10.
Lumogen® F Violet 570 Data Sheet; available at the BASF Chemical Company website Lumogen® F Violet 570 Data Sheet; available at the BASF Chemical Company website URL,http://worldaccount.basf.com/wa/EUen_GB/Catalog/Pigments/doc4/BASF/PRD/30048274/.pdt?title=Technicai%20Datasheet&asset_type=pds/pdf& language=EN&urn=urn:documentum:eCommerce_soi_EU:09007bb280021e27.pdf:09007bb280021e27.pdf.
Mar. 2, 2009 Office Action in U.S. Appl. No. 10/623,198, issued by Abu I Kalam.
Mar. 22, 2012 Office Action in U.S. Appl. No. 12/131,119, issued by Steven Y. Horikoshi.
Mar. 28, 2006 Office Action in U.S. Appl. No. 10/623,198, issued by Thao X. Le.
Mar. 4, 2011 Notice of Allowance, Notice of Allowability, Examiner's Interview Summary, Examiners Amendment/Comment and Examiner's Statement of Reason for Allowance in U.S. Appl. No. 11/264,124, issued by Abu I Kalam.
Mar. 7, 2008 Office Action in U.S. Appl. No. 10/623,198, issued by Abu I Kalam.
Maruska, H.P., "Gallium nitride light-emitting diodes (dissertation)", "Dissertation Submitted to Stanford University", Nov. 1973.
Maruska, H.P., et al., "Violet luminescence of Mg-doped GaN", "Appl. Phys. Lett.", Mar. 15, 1973, pp. 303-305, vol. 22, No. 6.
May 4, 2010 Office Action in U.S. Appl. No. 12/131,119.
McGraw-Hill, "McGraw-Hill Dictionary of Scientific and Technical Terms, Third Edition", "McGraw-Hill Dictionary of Scientific and Technical Terms", 1984, pp. 912 and 1446, Publisher: McGraw-Hill.
McGraw-Hill, "McGraw-Hill Encyclopedia of Science and Technology, Sixth Edition", "McGraw-Hill Encyclopedia of Science and Technology", 1987, pp. 582 and 60-63, vol. 9-10, Publisher: McGraw-Hill.
Mimura, Hidenori, et al., "Visible electroluminescence from uc-SiC/porous Si/c-Si p-n junctions", "Int. J. Optoelectron.", 1994, pp. 211-215, vol. 9, No. 2.
Miura, Noboru, et al., "Several Blue-Emitting Thin-Film Electroluminescent Devices", "Jpn. J. Appl. Phys.", Jan. 15, 1992, pp. L46-L48, vol. 31, No. Part 2, No. 1A IB.
Morkoc et al., "Large-band-gap SIC, 111-V nitride, and II-VI ZnSe-based semiconductor device technologies", J. Appl. Phys. 76(3), 1; Mar. 17, 1994; Illinois University.
Muench, W.V., et al., "Silicon carbide light-emitting diodes with epitaxial junctions", "Solid-State Electronics", Oct. 1976, pp. 871-874, vol. 19, No. 10.

(56) References Cited

OTHER PUBLICATIONS

Mukai, T., et al., "Recent progress of nitride-based light emitting devices", "Phys. Stat. Sol.", Sep. 2003, pp. 52-57, vol. 200, No. 1.

Nakamura, S., et al., "High-power InGaN single-quantum-well-structure blue and violet light-emitting diodes", "Appl. Phys. Lett.", Sep. 25, 1995, pp. 1868-1870, vol. 67, No. 13.

Nakamura, S., et al., "The Blue Laser Diode: GaN Based Light Emitters and Lasers", Mar. 21, 1997, p. 239, Publisher: Springer-Verlag.

Nakamura, S., et al., "The Blue Laser Diode: The Complete Story, 2nd Revised and Enlarged Edition", Oct. 2000, pp. 237-240, Publisher: Springer-Verlag.

Nov. 30. 2010 Office Action in U.S. Appl. No. 12/131,118.

Oct. 20, 2008 Office Action in U.S. Appl. No. 10/623,198, issued by Abu I Kalam.

Pankove, J.I., et al., "Scanning electron microscopy studies of GaN", "Journal of Applied Physics", Apr. 1975, pp. 1647-1652, vol. 46, No. 4.

Pavan, P., et al., "Explanation of Current Crowding Phenomena Induced by Impact Ionization in Advanced Si Bipolar Transistors by Means of . . . ", "Microelectronic Engineering", 1992, pp. 699-702, vol. 19.

Pei, Q, et al., "Polymer Light-Emitting Electrochemical Cells", "Science", Aug. 25, 1995, pp. 1086-1088, vol. 269, No. 5227.

Reexam Advisory Action dated Sep. 28, 2012 for U.S. Appl. No. 90/010,940.

Reexam Final Office Action dated May 24, 2012 for U.S. Appl. No. 90/010,940.

Reexam Final Office Action dated Nov. 7, 2011 for U.S. Appl. No. 90/010,940.

Reexam Non-Final Office Action dated Jan. 26, 2012 for U.S. Appl. No. 90/010,940.

Reexam Non-Final Office Action dated Mar. 3, 2011 for U.S. Appl. No. 90/010,940.

Reexam Non-Final Office Action dated Sep. 20, 2010 for U.S. Appl. No. 90/010,940.

Roman. D., "LEDs Turn a Brighter Blue", "Electronic Buyers' News", Jun. 19, 1995, pp. 28 and 35, vol. 960, Publisher: CMP Media LLC.

Saleh and Teich, Fundamentals of Photonics, New York: John Wiley & Sons, 1991, pp. 592-594.

Sato, Yuichi, et al., "Full-color fluorescent display devices using a near-UV light-emitting diode", "Japanese Journal of Applied Physics", Jul. 1996, pp. L838-L839, vol. 35, No. ?A.

Sep. 17, 2009 Notice of Allowance, Notice of Allowability, Examiners Amendmeni/Comment, and Examiners Statement of Reasons for Allowance in U.S. Appl. No. 10/623,198, issued by Abul Kalam.

Sep. 29, 2009 Office Action in U.S. Appl. No. 11/264,124, issued by Abu I Kalam.

Tanaka, Shosaku, et al., "Bright white-light electroluminescence based on nonradiative energy transfer in Ce-and Eu-doped SrS thin films", "Applied Physics Letters", Nov. 23, 1987, pp. 1661-1663, vol. 51, No. 21.

Tanaka, Shosaku, et al., "White Light Emitting Thin-Film Electroluminescent Devices with SrS:Ce,Cl/ZnS:Mn Double Phosphor Layers", "Jpn. J. Appl. Phys.", Mar. 20, 1986, pp. L225-L227, vol. 25, No. 3.

The Penguin Dictionary of Electronics, 3rd edition, pp. 315,437-438, 509-510, copyright 1979, 1988, and 1998.

Ura, M. , "Recent trends of development of silicon monocarbide blue-light emission diodes", "Kinzoku ", 1989, pp. 11-15, vol. 59, No. 9.

Werner, K. , "Higher Visibility for LEDs", "IEEE Spectrum", Jul. 1994, pp. 30-39.

Wojciechowski, J. et al. , "Infrared-To-Blue Up-Converting Phosphor", "Electron Technology", 1978, pp. 31-47, vol. 11, No. 3.

Yamaguchi, Y. et al., "High-Brightness SiC Blue LEDS and Their Application to Full Color LED Lamps", "Optoelectronics-Devices and Technologies", Jun. 1992, pp. 5767, vol. 7, No. 1.

Yang, Y., et al., "Voltage controlled two color light-emitting electrochemical cells", "Appl. Phys. Lett.", 1996, vol. 68, No. 19.

Yoshimi, Masashi, et al., "Amorphous carbon basis blue light electroluminescent device", "Optoelectronics- Devices and Technologies", Jun. 1992, pp. 69-81, vol. 7, No. 1.

Zanoni, E., et al., "Impact ionization, recombination, and visible light emission in ALGaAs/GaAs high electron mobility transistors", "J. Appl. Phys.", 1991, pp. 529-531, vol. 70, No. 1.

Zanoni, E., et al., "Measurements of Avalanche Effects and Light Emission in Advanced Si and SiGe Bipolar Transistors", "Microelectronic Engineering", 1991, pp. 23-26, vol. 15.

Zdanowski, Marek, "Pulse operating up-converting phosphor LED", "Electron Technol. ", 1978, pp. 49-61, vol. 11, No. 3.

Zhiming, Chen, et al., "Amorphous thin film white-LED and its light-emitting mechanism", "Conference Record of the 1991 International Display Research Conference", Oct. 1991, pp. 122-125.

* cited by examiner

LED-BASED LAMPS

CLAIM OF PRIORITY

This application claims the benefit of priority to U.S. Provisional Patent application 61/354,068, filed Jun. 11, 2010, entitled "LED Lamp", by Li et al., the specification and drawings of which are incorporated herein by reference.

BACKGROUND OF THE INVENTION

1. Field of the Invention

This invention relates to LED (Light Emitting Diode) based lamps and in particular, although not exclusively, to LED based spotlights.

2. Description of the Related Art

White light emitting LEDs ("white LEDs") are known in the art and are a relatively recent innovation. It was not until LEDs emitting in the blue/ultraviolet part of the electromagnetic spectrum were developed that it became practical to develop white light sources based on LEDs. As taught, for example in U.S. Pat. No. 5,998,925, white LEDs include one or more phosphor materials, that is photo-luminescent materials, which absorb a portion of the radiation emitted by the LED and re-emit radiation of a different color (wavelength). Typically, the LED chip generates blue light and the phosphor material(s) absorbs a percentage of the blue light and re-emits yellow light or a combination of green and red light, green and yellow light or yellow and red light. The portion of the blue light generated by the LED that is not absorbed by the phosphor material combined with the light emitted by the phosphor material provides light which appears to the human eye as being nearly white in color.

Currently there is a lot of interest in using high brightness white LEDs to replace conventional incandescent light bulbs, halogen reflector lamps and fluorescent lamps. Most lighting devices utilizing high brightness white LEDs comprise arrangements in which a plurality of LEDs replaces the conventional light source component and utilize the existing optical components such as a reflector and/or a lens. Ideally a spotlight would generate an illuminance (luminous flux (power) per unit area incident on a surface) that was substantially uniform across the lamp's emission angle (beam spread). However, as light emission from a lamp is confined within a selected emission angle this can result in a greater proportion of the light emission being concentrated on the axis thereby further reducing illuminance uniformity within the emission angle. Unlike a filament lamp which closely approximates to a point source, LED based lamps generates light which is often far from point source in character requiring the development of new optical arrangements for LED lamps for general lighting applications. A need exists for an LED based spotlight with a selected emission angle of 20° or less.

Co-pending U.S. patent application Ser. No. 12/721,311 filed Mar. 10, 2010 (Publication No. US2010/0237760), to Haitao YANG, teach an LED based downlight comprising a thermally conductive body; a plurality of LEDs configured as an array and mounted in thermal communication with the body; and a light reflective hood located in front of the plane of LEDs. The hood has at least two frustoconical (i.e. a cone whose apex is truncated by a plane that is parallel to the base) light reflective surfaces that surround the array of LEDs and are configured such that in operation light emitted by the lamp is within a selected emission angle. Whilst such a configuration can produce a good uniform illumination for emission angles of 40° and greater such a configuration is unsuitable for spotlights with lower emission angles and in particular spotlights with a compact form factor such as for example MR16 lamps.

U.S. Pat. No. 6,350,041 B1, to Tarsa et al., disclose solid state lamps comprising an elongate separator with a solid state light source (LED) at one end and a disperser at the other end that disperses light in a desired pattern (such as a radially uniform pattern). The disperser can also contain elements, such as phosphors to change the wavelength of at least some of the light from the light source. The separator provides physical separation between the LED and the disperser that is sufficient to prevent substantial heat transfer from the LED to the disperser. In the lamp of FIG. 1 the separator can comprise an optical waveguide and the disperser be hemispherical shaped and can be attached to the end of the separator or formed integrally with the separator. The disperser can include a phosphor for converting the wavelength of at least some of the light from the LED.

SUMMARY OF THE INVENTION

Embodiments of the invention are directed to lamps in which light generated by one or more solid-state light sources, typically LEDs, is coupled into a first end of a light guide and is guided, by total internal reflection, through the light guiding medium to a light emitting surface that is located at or in proximity to a second end of the light guide that is remote to the LED. One or more phosphor materials, photo-luminescent materials, are provided as a layer covering at least a part of the light emitting surface of the light guide which absorb a proportion of the LED light and in response emit light of a different color (typically of a longer wavelength). The emission product of the lamp comprises the combination of light emitted by the phosphor material and light generated by the LED that is not absorbed by the phosphor. Lamps in accordance with the invention provide a number of benefits including:

- the ability to provide increased cooling of the LED(s) since they can be located remote to the point of light emission thereby enabling the LED(s) to be mounted to a larger thermal mass such as the connector base used to provide electrical power to the lamp,
- reduced thermal degradation of the phosphor since it is located remote to the LED,
- the color and/or CCT of light emitted by the lamp can be altered by changing the light guide or other component on which the phosphor is provided or incorporated—such an arrangement can reduce production costs,
- a more consistent color and/or CCT of light emitted by the lamp since the phosphor is provided over a much greater area as compared to providing the phosphor directly to the light emitting surface of the LED die.

According to the invention a lamp comprises: a dish-shaped reflector; at least one LED operable to generate excitation light; a light guide configured to extend along an axis of the reflector, wherein light generated by the at least one LED is coupled into a first end of the light guide and wherein light is emitted from the light guide at a light emitting surface that is in proximity to a second end of the light guide and at least one phosphor material provided as a layer on at least a part of the light emitting surface of the light guide. In operation light generated by the LED is waveguided throughout the light guide by internal reflection and emitted from the light emitting surface of the light guide whereat a portion of light by the light emitting surface is absorbed by the at least one phosphor material which in response emits light having a dominant wavelength in a different wavelength range and wherein light emitted by the lamp comprises a combination of light emitted by the at least one LED and light generated by the at least one phosphor material. Typically the light guide is elongate in form such as a rod with a circular section. Alternatively the light guide can have other forms such as for example square, rectangular or elliptical cross sections. It will be appreciated that the light guide can have any form provided that it guides light the first and second ends.

Preferably the first end of the light guide is located outside of the reflector and the light guide can be configured to pass through an aperture in the reflector. By locating the first end outside the reflector enables the LED(s) to be located outside the reflector and mounted in thermal communication with a heat sink to aid in the dissipation of heat generated by the LED(s).

In one arrangement the light emitting surface of the light guide is located within the internal volume defined by the reflector. In such arrangements the light emitting surface is configured to emit at least a portion of the light in a direction towards the reflector.

In one arrangement the light emitting surface of the light guide comprises a generally conical surface that is configured to emit light in a direction towards the reflector. To prevent the emission of light from the second end of the light guide the lamp can further comprise a light reflective surface on the base of the conical surface. To maximize light emission from the light guide, the base of the conical end of the light guide can further comprise a conical indentation that is configured to maximize the proportion of reflected light that strikes the light emitting surface at angles above the critical angle.

In an alternative arrangement the light emitting surface of the light guide can comprise a generally hemispherical surface. In such a configuration the lamp preferably comprises a second reflector configured to direct light emitted by the light emitting surface towards the dish-shaped reflector. The second reflector can be formed as an integral part of the dish-shaped reflector or as a separate component. Where the second reflector is formed integrally with the dish-shaped reflector the second reflector can be attached to the dish-shaped reflector two or more arms that extend in a radial direction. Where the second reflector comprises a separate component it can be mounted to an inner surface, or formed integrally with, a light transmissive cover overlaying the dish-shaped reflector.

To reduce light escape from the light guide during transmission from the LED to the light emitting surface the lamp can further comprise a light reflective surface, such as a metallization layer, on the outer surface of the light guide.

To aid in the dissipation of heat generated the one or more LEDs, the lamp preferably further comprises a thermally conductive body to which the one or more LEDs is/are mounted in thermal communication with. Since the invention find particular application to spotlights, though it is not restricted to such lamps, body is generally frusto-conical in form and is preferably configured such that the lamp can be fitted directly in an existing lighting fixture. Advantageously the body is configured such that it has a form factor that resembles a standard form such as a Multifaceted Reflector (MR) lamp such as an MR16 or MR11 or a Parabolic Aluminized Reflector (PAR) such as a PAR20, PAR30, PAR38, PAR56 or PAR64. To maximize heat dissipation the body is made from a material with as high a thermal conductivity as possible and is preferably at least 150 $Wm^{-1}K^{-1}$ and more preferably at least 200 $Wm^{-1}K^{-1}$. The body can be made of aluminum, an alloy of aluminum, a magnesium alloy, copper or a thermally conductive ceramic material. To further aid in the dissipation of heat the body can further comprise a plurality of heat radiating fins.

Typically the dish-shaped reflector comprises a light reflective surface that is generally parabolic and can be multifaceted or a continuous surface. The dish-shaped reflector can be made from Acrylonitrile Butadiene Styrene (ABS), a polycarbonate, an acrylate, polymer material, aluminum, an aluminum alloy or a magnesium alloy.

According to a further aspect of the invention an LED bulb comprises: at least one LED operable to generate blue excitation light; a light guide having first and second ends and a light emitting surface associated with the second end and at least one phosphor material associated with the light emitting surface of the light guide; wherein blue light generated by the at least one LED is coupled into the first end of the light guide and is waveguided throughout the light guide by internal reflection and emitted from the light emitting surface of the light guide whereat a portion of light by the light emitting surface is absorbed by the at least one phosphor material which in response emits light having a dominant wavelength in a different wavelength range and wherein light emitted by the bulb comprises a combination of blue light emitted by the at least one LED and light generated by the at least one phosphor material.

To ensure that light is emitted substantially isotropically (i.e. substantially equally in all directions) the light emitting surface of the light guide can be substantially spherical, an oblate spheroid, a prolate spheroid or generally ellipsoidal in form. In one arrangement the at least one phosphor can be provided as a layer on the light emitting surface of the light guide. Alternatively, where the bulb further comprises a light transmissive envelope surrounding at least the light emitting surface of the light guide, the at least one phosphor can be provided as a layer on at least a part of an inner or outer surfaces of the envelope. In a further arrangement the at least one phosphor is incorporated within the envelope and distributed substantially uniformly throughout the volume of the envelope.

In a further embodiment intended to simulate a candle bulb the light emitting surface of the light guide is generally teardrop in form to resemble a flame.

BRIEF DESCRIPTION OF THE DRAWINGS

In order that the present invention is better understood LED lamps in accordance with the invention will now be described, by way of example only, with reference to the accompanying drawings in which.

DETAILED DESCRIPTION OF THE INVENTION

Figure 1:
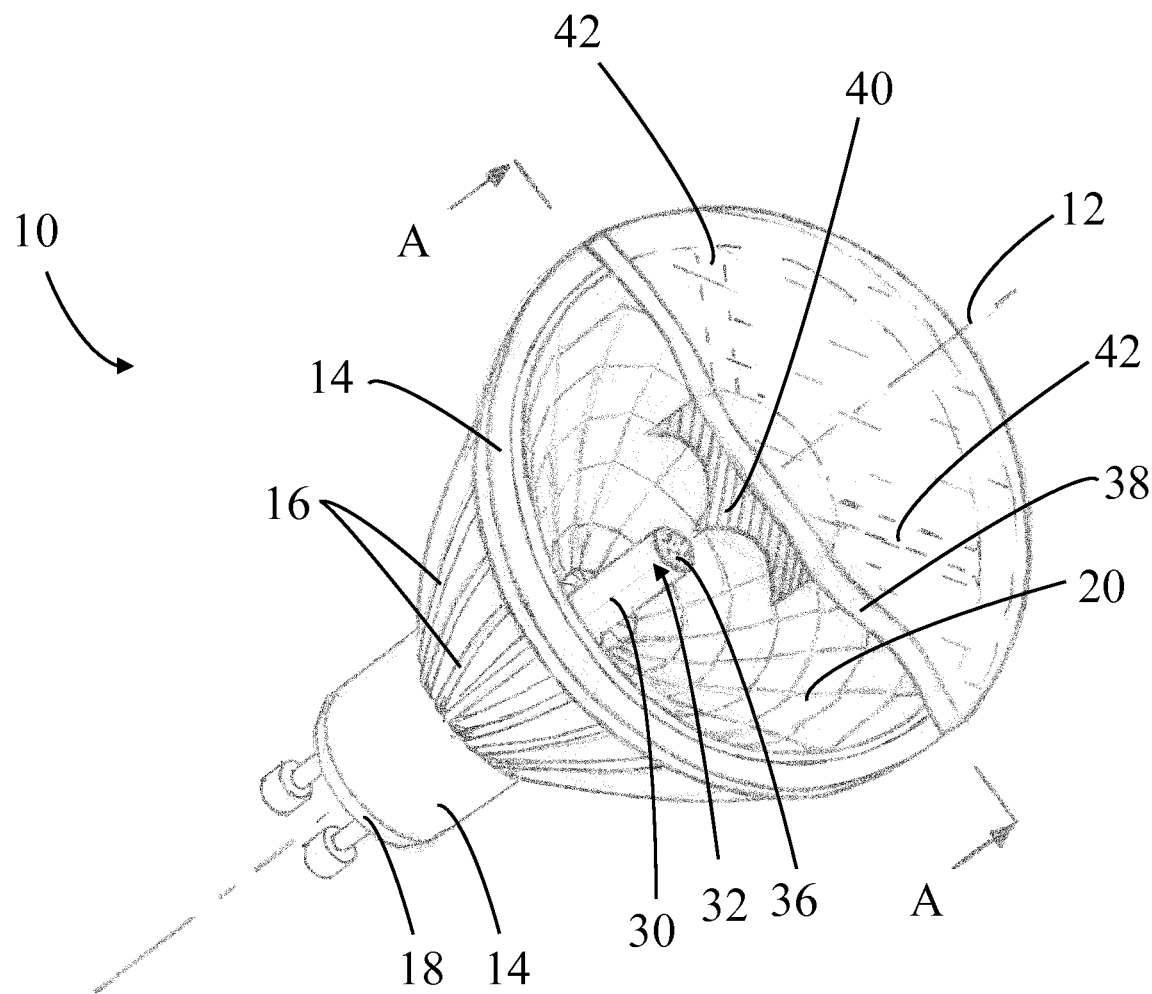
FIG. 1 is a partially cutaway perspective view of an LED spotlight in accordance with an embodiment of the invention.

Embodiments of the invention are directed to LED-based lamps in which light generated by one or more LEDs is coupled into a first end of a light guide and is waveguided, by total internal reflection, through the light guiding medium to a light emitting surface that is located remote to the LED(s). One or more phosphor materials, photoluminescent materials, is/are provided on, or in proximity to, the light emitting surface of the waveguide and absorbs a proportion of the LED light and in response emits light of a different color (typically of a longer wavelength) which combined with the LED light that is not absorbed by the phosphor comprises light emitted by the lamp.

In one arrangement the lamp can be configured as a spotlight and comprises a dish-shaped reflector, typically generally parabolic in form, and an elongate light guide that extends along the axis of the reflector and is configured to emit light in a direction toward the reflector. The one or more LEDs can be located outside the reflector in a connector cap or mounted in thermal communication with a thermally conductive substrate such as a body of the spotlight. The one or more phosphor materials can be located on the light emitting face of the light guide in the form of one or more layers or on a light reflective surface located in proximity to and separated from the light emitting face of the light guide.

Throughout this patent specification like reference numerals are used to denote like parts.

Figure 2:
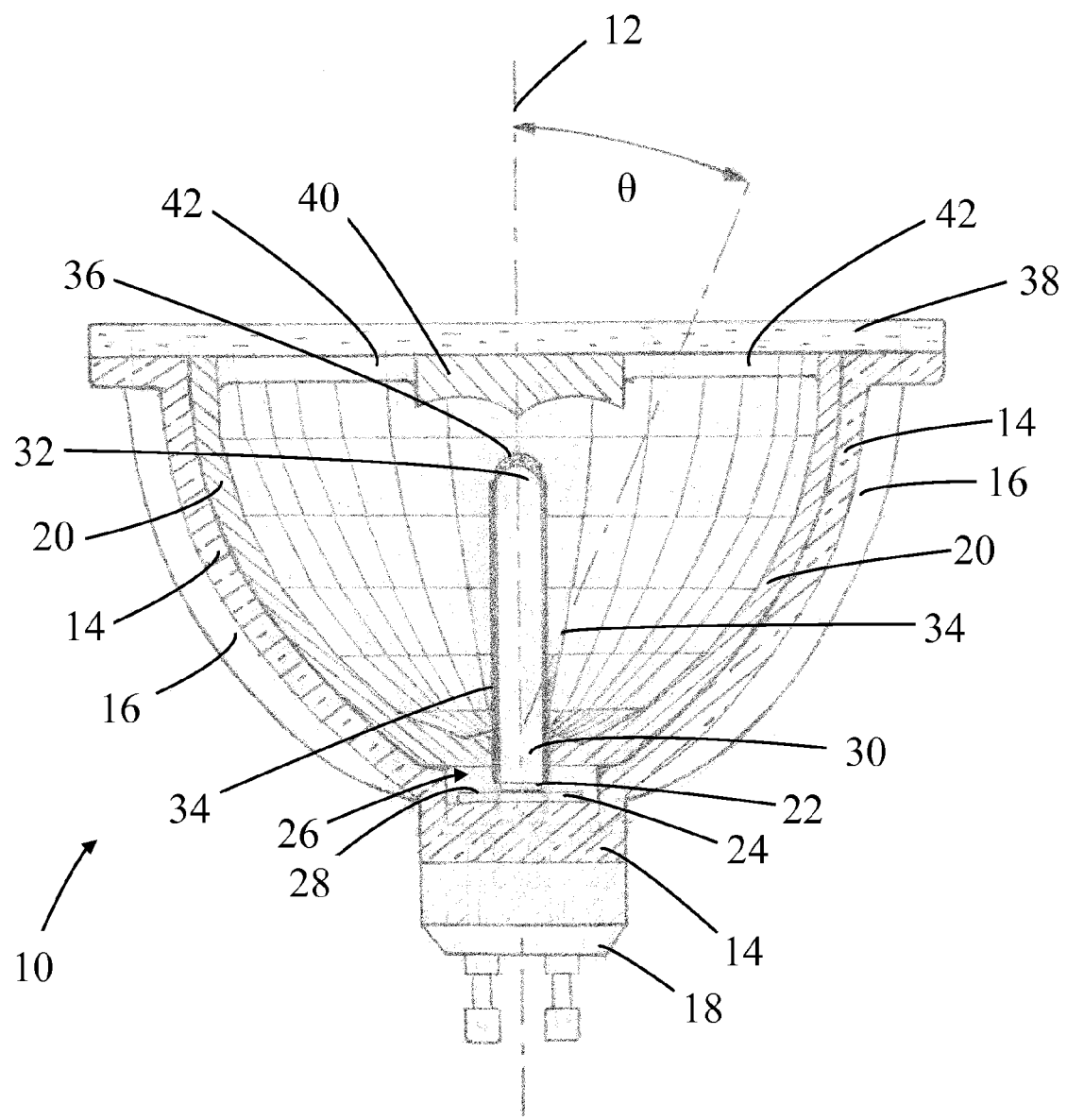
FIG. 2 is a sectional view of the LED spotlight of FIG. 1 through A-A.

An LED-based spotlight 10 in accordance with an embodiment of the invention will now be described with reference to FIGS. 1 and 2 in which FIG. 1 is a partial sectional perspective view of the spotlight and FIG. 2 is a sectional view of the spotlight through A-A. The spotlight 10 is configured to generate white light with a Correlated Color Temperature (CCT) of ≈3100K, an emission intensity of ≈250 lumens and a nominal (selected) beam spread (emission angle θ–angle of divergence measured from a central axis 12) of 35° (spot). It is intended to be used as an energy efficient replacement for an MR16 halogen lamp and is operable from a 110V AC supply as is common within the United States.

The spotlight 10 comprises a hollow generally conical shaped thermally conductive body 14 whose outer surface resembles a frustum of a cone; that is, a cone whose apex (vertex) is truncated by a plane that is parallel to the base (i.e. frusto-conical). For aesthetic reasons the form factor of the body 14 can be configured to resemble a standard Multifaceted Reflector MR16 body shape. Configuring the body 14 such that its form factor resembles a standard form enables the lamp 10 to be retrofitted directly in existing lighting fixtures such as spotlight fixtures, track lighting or recessed lighting fixtures. The body 14 can be fabricated from die cast aluminum and as shown can comprise latitudinal extending heat radiating fins (veins) 16 that are circumferentially spaced around the outer curved surface of the body 14. Alternatively the body can be constructed from an alloy of aluminum, a magnesium alloy, a metal loaded plastics material or a thermally conductive ceramic material such as aluminum silicon carbide (AlSiC). Preferably the body is thermally conductive and has a thermal conductivity of at least 150 $Wm^{-1}K^{-1}$.

The spotlight 10 further comprises a GU10 bi-pin twistlock (bayonet) base 18 thereby enabling the spotlight to be connected directly to a mains power supply using a standard lighting fixture (not shown). It will be appreciated that depending on the intended application other connector caps can be used such as, for example, a bi-pin connector base GU5.3 or GX5.3 for 12 volt applications or an Edison screw base (E12, E17 or E26) or bayonet connector base. As shown the connector base 18 can be mounted to the truncated apex of the body 14.

Mounted within the front of the body (that is the base of the cone) the lamp 10 further comprises a dish-shaped reflector 20 which is configured to define the selected emission angle (beam spread) of the lamp (i.e. θ≈35° in this example). The inner surface of the reflector 20 comprises a elliptical paraboloid quadratic surface as defined by rotational of an ellipse. As shown the reflector 20 can comprise a multifaceted reflector though it can also comprise a continuous curved surface. The reflector 20 is preferably fabricated from ABS (Acrylonitrile butadiene styrene) or another polymer material such as a polycarbonate or acrylic with a light reflective surface such as a metallization layer of chromium or aluminum. Alternatively the reflector 20 can comprise a material with a good thermal conductivity (i.e. typically at least 150 $Wm^{-1}K^{-1}$ and preferably at least 200 $Wm^{-1}K^{-1}$) such as aluminum or an aluminum alloy to aid in the dissipation of heat. To further aid in the dissipation of heat the reflector 20 can be thermally coupled to the body 14.

The spotlight further comprises a blue light emitting LED 22 that is mounted in thermal communication with a thermally conductive substrate such as an MCPCB (Metal Core Printed Circuit Board) 24. As is known an MCPCB comprises a layered structure composed of a metal core base, typically aluminum, a thermally conducting/electrically insulating dielectric layer and a copper circuit layer for electrically connecting electrical components in a desired circuit configuration. The MCPCB 24 is housed within a cavity 26 in the base of the body 14 below the reflector 20. The metal core base of the MCPCB 24 is mounted in thermal communication with the thermally conductive body 14 with the aid of a thermally conducting compound such as for example an adhesive containing a standard heat sink compound containing beryllium oxide or aluminum nitride. In alternative arrangements the substrate can comprise other materials with a good thermal conductivity that is typically at least 150 $Wm^{-1}K^{-1}$ and preferably at least 200 $Wm^{-1}K^{-1}$ such as an aluminum alloy, copper or an alloy of copper. Rectifier circuitry 28 for operating the LED 22 directly from an alternating current (AC) mains power supply can be mounted to the MCPCB 24. The MCPCB is housed within the body 14 in a cavity 26 below the reflector.

The LED 22 can comprise a ceramic packaged ≈4.4 W gallium nitride-based blue emitting LED chip. The LED chips generate blue light with a peak wavelength in a range 400 nm to 480 nm and typically 455 nm. The LED 22 is configured such that it emits light in a direction corresponding to the light emission axis 12 of the spotlight.

In accordance with the invention the spotlight 10 further comprises a light guide 30 which in this example comprises a rod of circular cross section that is configured to run along the axis 12 of the spotlight. The light guide 30 can comprise any light transmissive material such as a polycarbonate, acrylic or glass. Other suitable materials for the light guide will be apparent to those skilled in the art. A first end of the light guide 30 extends through an aperture in the base of the reflector 20 and is optically coupled to the LED 22. The first end of the light guide 28 can further comprise one or more generally hemispherical indents or other features to aid in coupling light emitted by the LED into the light guide 30. The second end 32 of the light guide 30, that is the end distal to the LED, constitutes a light emitting surface of the light guide and as shown can be generally hemispherical or dome-shaped in form. The light emitting surface of the light guide is located within the interior volume defined by the reflector 20. A light reflective coating 34, such as a metallization layer of aluminum, silver or chromium, can be provided on a part or all of the outer curved surface of the light guide to prevent the emission of light through the curved surface of the light guide and ensure that all light is emitted from the light emitting face. In the accompanying drawings the light reflective coating 34 is indicated by a heavy line and covers the entire curved surface of the light guide thereby ensuring that all light is emitted from the light emitting surface (second end of the light guide).

Since it is generally required to generate white light the LED spotlight further includes one or more phosphor (photo luminescent) materials 36 which absorb a proportion of the blue light emitted by the LED chip and emit yellow, green, red light or a combination thereof. The blue light that is not absorbed by the phosphor material(s) combined with light emitted by the phosphor material(s) gives the spotlight 10 an emission product that appears white in color.

The phosphor material, which is typically in powder form, is mixed with a transparent binder material such as a polymer material (for example a thermally or UV curable silicone or an epoxy material) and the polymer/phosphor mixture applied to the light emitting face of the light guide 32 in the form one or more layers of uniform thickness. The color and/or CCT of the emission product of the spotlight is determined by the phosphor material composition and quantity of phosphor material. The phosphor material(s) required to generate a desired color or CCT of white light can comprise any phosphor material(s) in a powder form and can comprise an inorganic or organic phosphor such as for example silicate-based phosphor of a general composition $A_3Si(O,D)_5$ or $A_2Si(O,D)_4$ in which Si is silicon, O is oxygen, A comprises strontium (Sr), barium (Ba), magnesium (Mg) or calcium (Ca) and D comprises chlorine (Cl), fluorine (F), nitrogen (N) or sulfur (S). Examples of silicate-based phosphors are disclosed in U.S. Pat. No. 7,575,697 "Europium activated silicate-based green phosphor" (assigned to Internatix Corporation), U.S. Pat. No. 7,601,276 "Two phase silicate-based yellow phosphor" (assigned to Internatix Corporation), U.S. Pat. No. 7,655,156 "Silicate-based orange phosphor" (assigned to Internatix Corporation) and U.S. Pat. No. 7,311,858 "Silicate-based yellow-green phosphor" (assigned to Internatix Corporation). The phosphor can also comprise an aluminate-based material such as is taught in U.S. Pat. No. 7,541,728 "Aluminate-based green phosphor" (assigned to Internatix Corporation) and U.S. Pat. No. 7,390,437 "Aluminate-based blue phosphor" (assigned to Internatix Corporation), an aluminum-silicate phosphor as taught in U.S. Pat. No. 7,648,650 "Aluminum-silicate orange-red phosphor" (assigned to Internatix Corporation) or a nitride-based red phosphor material such as is taught in co-pending U.S. patent application Ser. No. 12/632,550 filed Dec. 7, 2009 (Publication No. US2010/0308712). It will be appreciated that the phosphor material is not limited to the examples described herein and can comprise any phosphor material including nitride and/or sulfate phosphor materials, oxy-nitrides and oxy-sulfate phosphors or garnet materials (YAG).

In order to provide adequate thermal isolation of the phosphor material layer 36 from heat generated by the LED the light guide 28 is, in an axial direction, typically at least 25 mm in length.

The spotlight 10 further comprises a front reflector 40 that is coaxial with the emission axis 12 of the spotlight. In one embodiment the front reflector 40 is formed as an integral part of the reflector 20 and is attached to the rim of the reflector 20 by two or more radially extending spokes (arms) 42. As shown in FIGS. 1 and 2 the front reflector 40 can comprise a light reflective surface that is defined by rotation of an arc in its plane about a coplanar axis (i.e. a surface of revolution). In the drawings the surface is part of a torus and is generally conical in form with an apex that is directed towards the light emitting face of the light guide and whose conical surface is concave in form. Towards the periphery of the front reflector the light reflective surface curves back towards the light guide 30.

The spotlight 10 can further comprise a light transmissive front cover (window) 38 which is mounted to the front of the reflector 20. For ease of understanding the cover 38 and front reflector 40 are shown partially cutaway in FIG. 1. Typically the cover 38 comprises a light transmissive (transparent) window for example a polymer material such as a polycarbonate or acrylic or a glass. It is envisioned in alternative arrangements that the front reflector 40 be separate from the reflector 20 and be mounted to the inner face of the cover 38 thereby dispensing with need for the arms 42 which can interfere with the emission of light or otherwise be visually unattractive.

Figure 3:
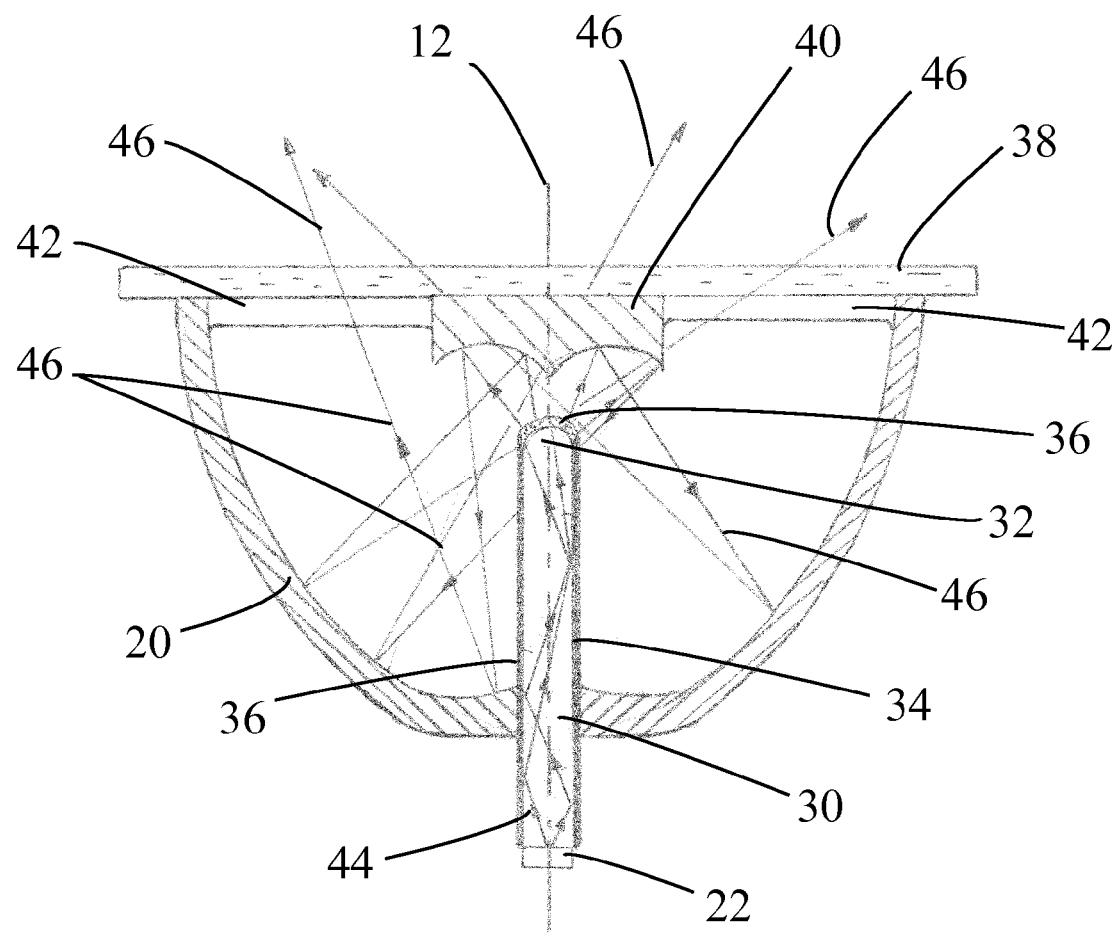
FIG. 3 is a schematic sectional view illustrating the principle of operation of the LED spotlight of the invention.

FIG. 3 is a schematic sectional view showing the principle of operation of the spotlight 10 of the invention. In operation light 44 generated by the LED 22 is coupled into a first end of the light guide 30 and is waveguided along the length of the light guide by a process of multiple internal reflections. Light 44 striking the dome-shaped light emitting surface at angles to the surface above the critical angle is emitted through the dome-shaped light emitting surface 32 whereat a portion of it is absorbed by the phosphor 36 which in response emits light of a different color (wavelength). The phosphor 36 is configured (i.e. thickness and composition) such that the light generated by the phosphor combined with the portion of blue light 44 that is not absorbed by the phosphor appears white in color and has a selected CCT and constitutes the emission product 46 of the spotlight. Due to the isotropic nature of photoluminescent light generation light 46 emitted by the end of the light guide will be emitted over a range of angles from being approximately radial to parallel with the emission axis 12. As shown in FIG. 3 the light 46 will be reflected by the front reflector 40 away from the emission direction of the spotlight back towards the parabolic reflector 20 which in turn reflects the light such that light emission from the spotlight is confined to the emission angle θ (e.g. 35°). The reflector 20 can be configured such that the full width half maximum (FWHM) emission occurs within the selected emission angle θ.

Figure 4:
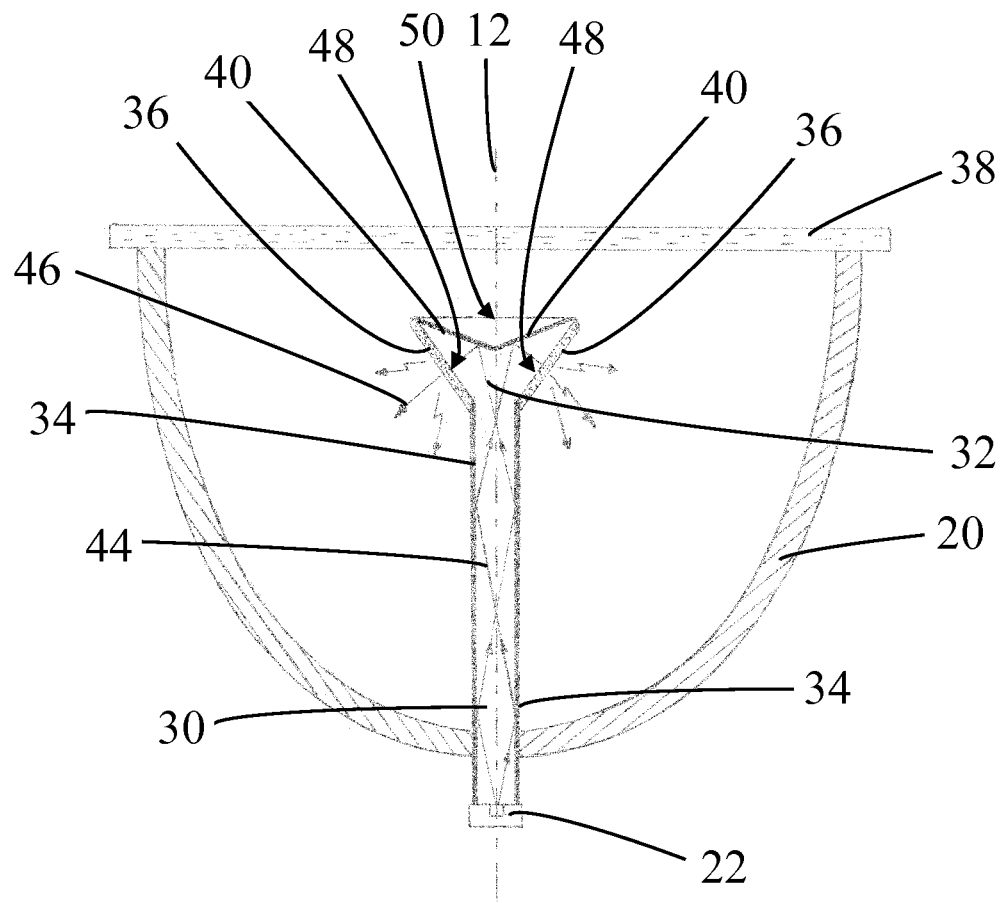
FIGS. 4 and 5 are schematic sectional views illustrating alternative optical configurations for LED spotlights in accordance with the invention.
Figure 5:
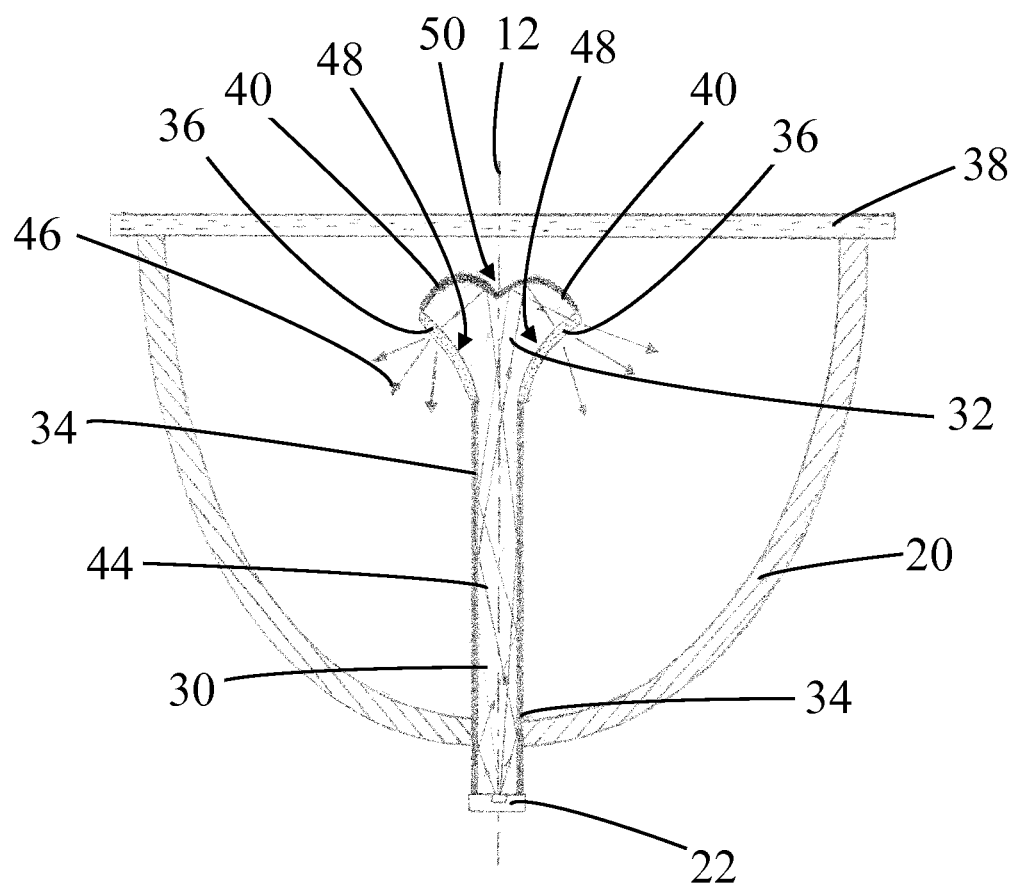

FIGS. 4 and 5 are schematic sectional views illustrating examples of alternative optical configuration for an LED spotlight in accordance with the invention. In the embodiment of FIG. 4 the second (light emitting) end 32 of the light guide 30 tapers outwardly and is frusto-conical in form with the truncated apex of the cone located at the end of the light guide 30. The curved conical surface of the end 32 constitutes a light emitting surface 48 of the light guide and has a layer of phosphor 36 over its entire surface. The base of the frusto-conical end 32 (i.e. the most distal portion to the LED) has a conical indentation 50 and a metallization layer to prevent emission of light from the second end of the light guide. The indentation 50 and metallization layer constitute the front reflector 40. In operation light 44 generated by the LED 22 is coupled into a first end of the light guide 30 and is waveguided along the length of the light guide by a process of multiple internal reflections. The light 44 is then reflected and directed back toward the light emitting surface 48 by the front reflector 40. Light 44 striking the light emitting surface 48 at angles above the critical angle is emitted through the conical light emitting surface 48 whereat a portion of it is absorbed by the phosphor 36 which in response emits light of a different color (wavelength). The thickness and composition of the phosphor 36 is configured such that the light generated by the phosphor combined with the portion of blue light 44 that is not absorbed by the phosphor appears white in color and has a selected CCT and constitutes the emission product 46 of the spotlight. Due to the isotropic nature of photoluminescent light generation white light 46 emitted by the end of the light guide will be emitted over a range of angles from being approximately radial to approximately parallel with the emission axis 12 but in a direction toward the base of the parabolic reflector. The parabolic reflector 20 reflects the light such that light emission from the spotlight is confined to the emission angle θ (e.g. 35°).

In the exemplary embodiment illustrated in FIG. 5 the light emitting end 32 of the light guide 30 tapers outwardly and is generally frusto-conical in form with the truncated apex of the cone located at the end of the light guide. The curved concave conical surface of the end 32 constitutes a light emitting surface 48 of the light guide and has a layer of phosphor 36 over its entire surface. The base of the frusto-conical end 32 (i.e. the most distal portion to the LED) constitutes the front reflector 40 and has a metallization layer to prevent emission of light from the end of the light guide. As illustrated the base can be profiled, such as a convex generally conical indentation 50 to maximize light emission through the light emitting surface 48. Operation is analogous to the arrangement of FIG. 4 and is not described further.

Although the lamp of the present invention has been described in relation to an LED spotlight with a small form factor such as MR11 and MR16 it is envisaged that the invention be applied to other lamps including Parabolic Aluminized Reflector (PAR) lamps such as PAR20 (Ø2.5" or Ø6.5 cm), PAR30 (Ø3.75" or Ø9.5 cm), PAR38 (Ø4.75" or Ø12.2 cm), PAR56 (Ø7" or Ø17.5 cm) and PAR64 (Ø8" or Ø20 cm) lamps. In such lamps the light guide may have a minimum length, in an axial direction, of 70 mm to 100 mm. As well standard forms the body 14 can have a non-standard form factor and be configured such that the lamp can be retrofitted in standard lighting fixtures. Examples of such geometries can include for example a body that is generally cylindrical or generally hemispherical depending on an intended application. It will be appreciated that the inventive concepts can be applied to lamps with other emission angles such as those ranging from a narrow spot (θ=8°) to a wide flood (θ=60°). Typically for down lighting and general lighting applications the emission angle θ is of order 30°, 45° or 60°.

Moreover, as will now be described, the lamp of the invention further applies to other lamp geometries such as a conventional light bulb or ornamental bulb such as a candle bulb.

Figure 6:
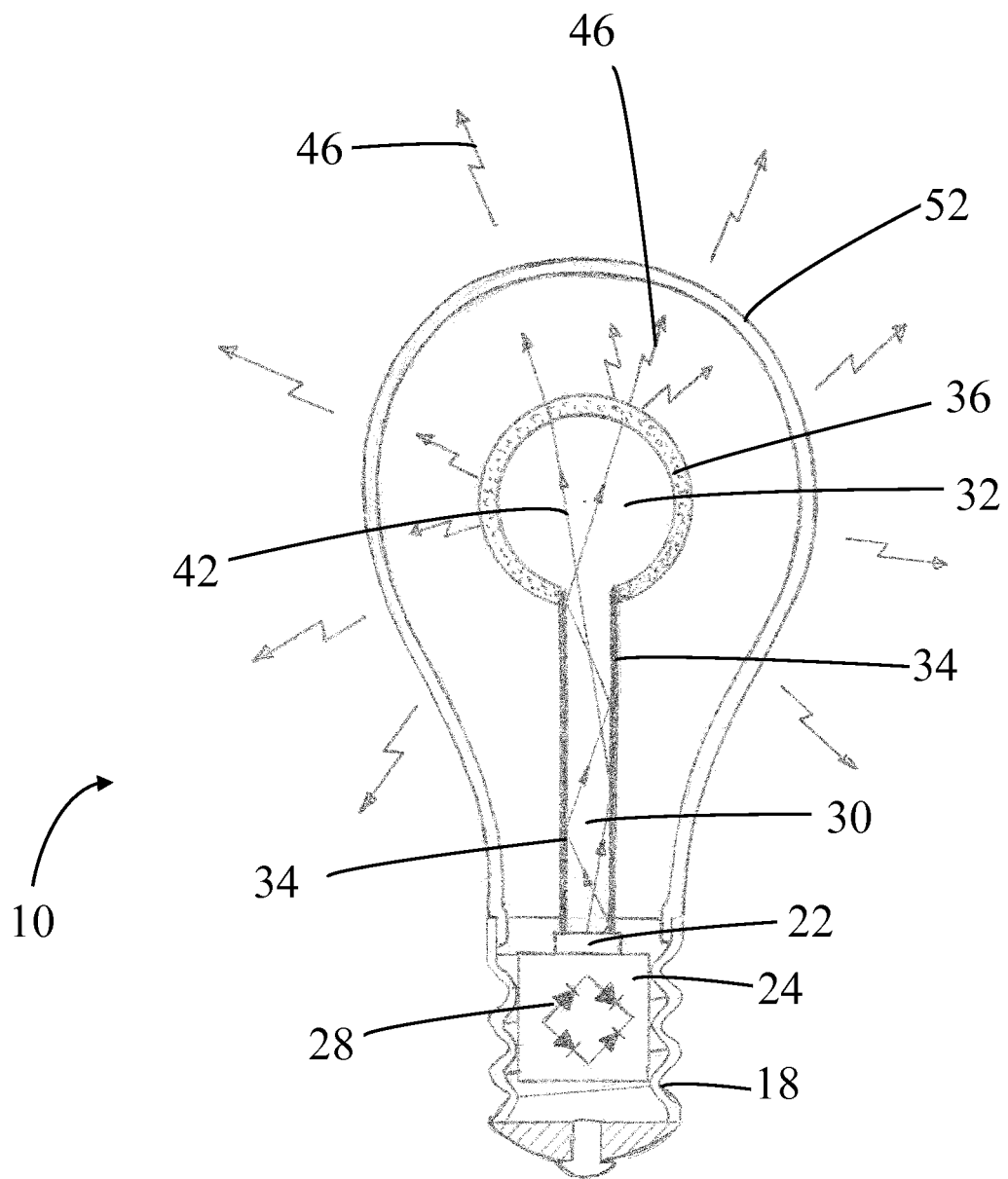
FIG. 6 is a schematic sectional view of an LED light bulb in accordance with another embodiment of the invention.

FIG. 6 is a schematic sectional view of an LED-based light bulb 10 in accordance with an embodiment of the invention. The light bulb 10 is configured to generate white light with a Correlated Color Temperature (CCT) of ≈3000K and an emission intensity of ≈600-700 lumens. It is intended to be used as an energy efficient replacement for a conventional incandescent filament light bulb and is operable from a 110V AC supply.

In this embodiment the connector base 18 can comprise an Edison Screw base such as an E26 (26 mm Medium or standard Edison Screw MES or ES). As shown the screw base 18 can house rectifier or other drive circuitry 28. The LED 22 is also housed within the connected base and is mounted in good thermal communication with the connector cap 18 to aid in the dissipation of heat generated by the LED. The light emitting end 32 of the light guide can, as shown, comprise a generally spherical surface to ensure that light 46 is emitted substantially isotropically (i.e. substantially equally in all directions) thereby resembling the light emission of a filament of a conventional incandescent light bulb. The phosphor 36 is applied as a uniform thickness layer to the spherical light emitting surface 32. As shown the lamp further comprises a light transmissive envelope 52 whose form factor resembles a conventional light bulb. The envelope is preferably molded from a light transmissive material such as a polymer material, polycarbonate or acrylic or a glass. The light guide can be fabricated by injection molding and the phosphor layer then applied to the spherical light emitting surface. Alternatively the phosphor can be mixed with an light transmissive polymer and the phosphor polymer mixture molded, for example by a second injection molding, onto the spherical light emitting surface.

In operation light 44 generated by the LED 22 is coupled into a first end of the light guide 30 and is waveguided along the length of the light guide by a process of multiple internal reflections. Light 44 striking the light emitting surface 32 at angles above the critical angle is emitted through the spherical-shaped light emitting surface 32 whereat a portion of it is absorbed by the phosphor 36 which in response emits light of a different color (wavelength). The thickness and composition of the phosphor 36 is configured such that the light generated by the phosphor combined with the portion of blue light 44 that is not absorbed by the phosphor appears white in color and has a selected CCT and constitutes the emission product 46 of the bulb. The emission product is emitted through the light transmissive envelope 52. It will be appreciated that depending on a required emission pattern, the light emitting surface can have other forms such as for example being an oblate or prolate spheroid or generally ellipsoidal in form.

Figure 7:
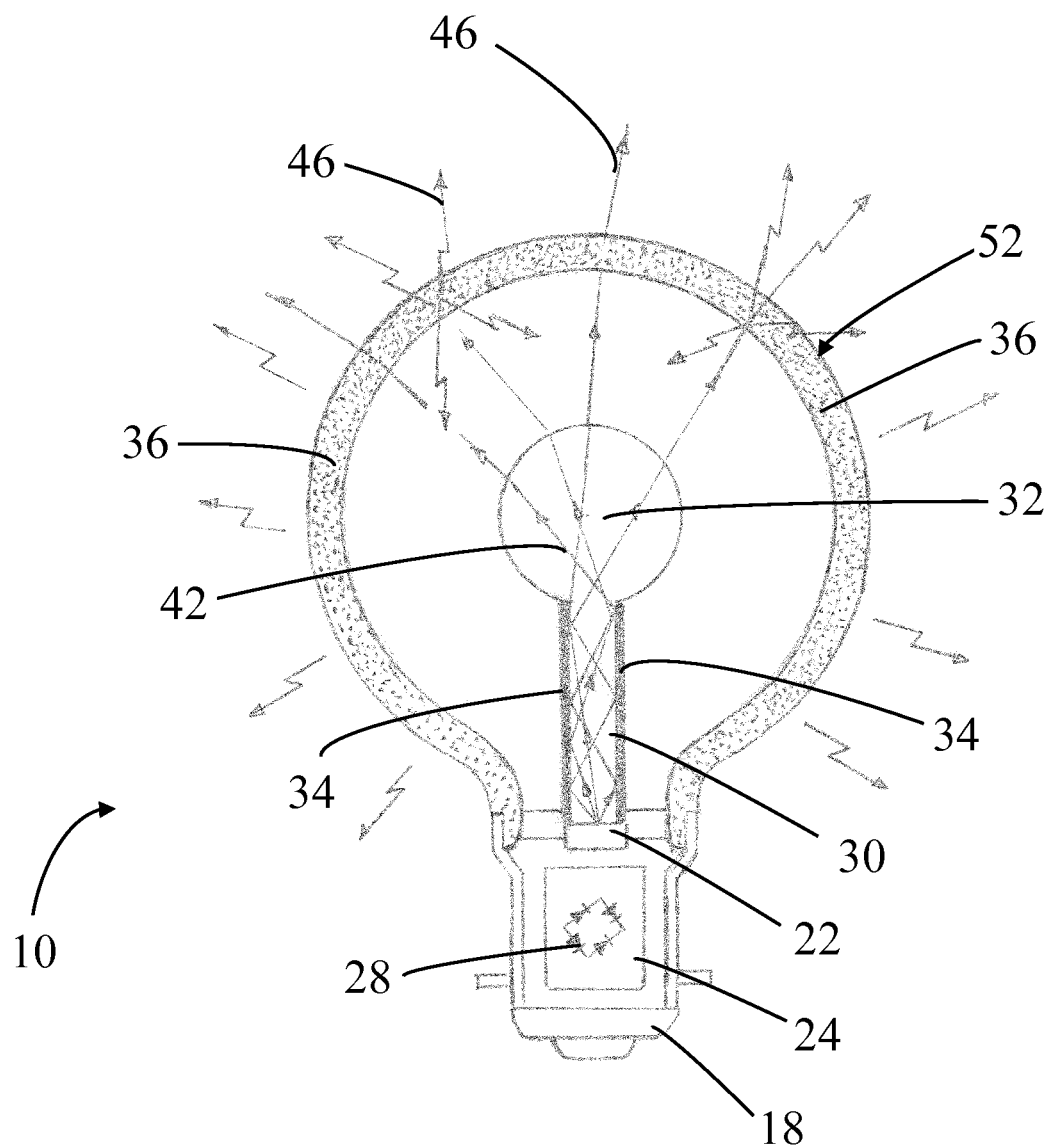
FIG. 7 is a schematic sectional view of an LED light bulb in accordance with a further embodiment of the invention.

FIG. 7 is a schematic sectional view of an LED light bulb 10 in accordance with a further embodiment of the invention. The light bulb 10 is configured to generate white light with a Correlated Color Temperature (CCT) of ≈3000K and an emission intensity of ≈600-700 lumens. It is intended to be used as an energy efficient replacement for a conventional incandescent filament light bulb and is operable from a 240V AC supply as used in the United Kingdom.

In this embodiment the connector base 18 can comprise a double contact B22d bayonet connector cap enabling the bulb to be connected directly to a mains power supply using a standard bayonet light socket. As shown the phosphor 36 can be incorporated (homogeneously distributed) within the envelope 52. Alternatively the phosphor can be provided as one or more layers on the inner and/or outer surface of the envelope 52.

In operation light 44 generated by the LED 22 is coupled into a first end of the light guide 30 and is waveguided along the length of the light guide by a process of multiple internal reflections. Light 44 striking the light emitting surface 32 at angles above the critical angle is emitted through the spherical-shaped light emitting surface 32. Eventually the light enters the envelope where a portion of it is absorbed by the phosphor 36 which in response emits light of a different color (wavelength). The weight loading of phosphor within the envelope 50 is configured such that the light generated by the phosphor combined with the portion of blue light 44 that is not absorbed by the phosphor appears white in color and has a selected CCT and constitutes the emission product 46 of the bulb.

Figure 8A:
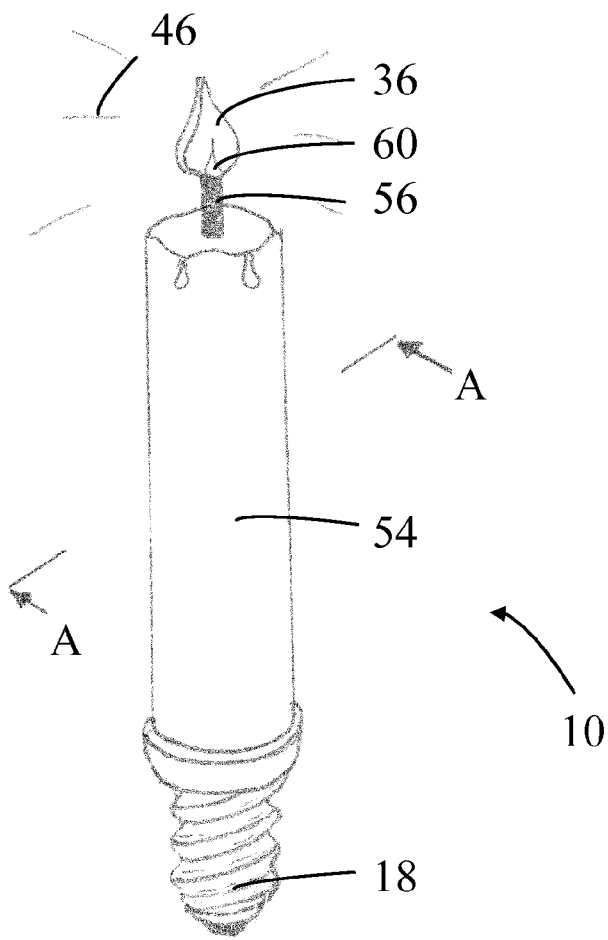
FIG. 8a is a schematic perspective view of an ornamental LED candle lamp in accordance with a yet further embodiment of the invention.
Figure 8B:
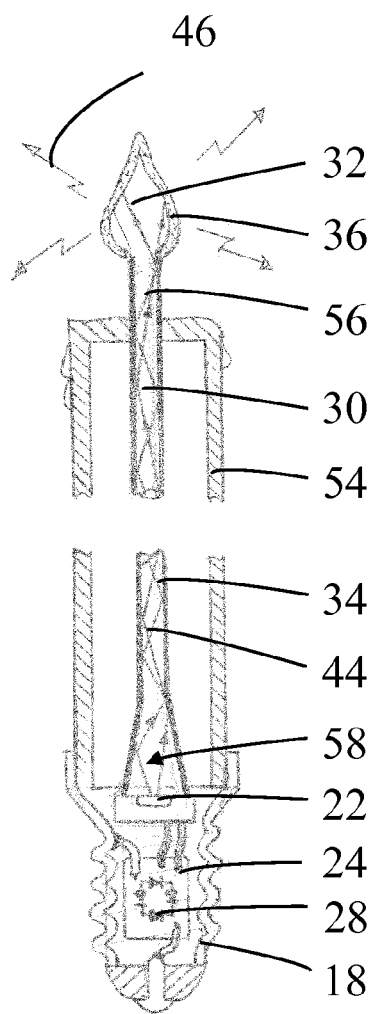
FIG. 8b is a sectional view of the candle lamp of FIG. 7a through A-A.

FIGS. 8a and 8b respectively show a schematic perspective view and a sectional view through A-A of an ornamental LED-based candle lamp 10 in accordance with an embodiment of the invention. The candle lamp 10 is configured to generate white light with a Correlated Color Temperature (CCT) of ≈2700K and an emission intensity of ≈100 lumens. It is intended to be used as an energy efficient replacement for a conventional incandescent candle light bulb and is operable from a 110V AC supply.

In this embodiment the connector base 18 can comprise an E12 Edison Screw base (12 mm Candelabra Edison Screw CES) or E17 screw base (17 mm Intermediate Edison Screw IES). The lamp further comprises a hollow cylindrical body 54 that is configured to resemble a wax candle. Since candle bulbs are often used more for decorative purposes rather than their light emission, the body 54 can be made of a plastics material such as a polycarbonate or acrylic. Alternatively the body can be made of a thermally conductive material such as aluminum or an aluminum alloy and the LED mounted in thermal communication with the body 54. As shown in FIG. 8b rectifier or other drive circuitry 28 and the LED 22 can be housed within the screw base 18. In alternative arrangements the circuitry and/or LED can be housed within the body 54.

The light guide 30 passes along the length of the body and a portion 56 of the light guide extends out of the top of the housing 54 and is configured to represent a candle wick. The light emitting end 32 of the light guide can be configured to resemble a flame that is generally tear drop shaped. The phosphor 36 is applied as a uniform thickness layer to the flame shaped light emitting surface 32. Since the portion 56 of the light guide that represents the wick has by necessity to be elongate in form (i.e. its length is much greater that its width) the light guide 30 can further comprise an outwardly tapering portion 58 to facilitate coupling of light from the LED 22 into the light guide. As shown the tapered portion 56 of the light guide can be located in proximity to the LED and housed within the housing 54.

In operation light 44 generated by the LED 22 is coupled into a first end of the light guide 30 and is waveguided along the length of the light guide by a process of multiple internal reflections. Light 44 striking the light emitting surface 32 is emitted through the flame-shaped light emitting surface 32 whereat a portion of it is absorbed by the phosphor 36 which in response emits light of a different color (wavelength). The thickness and composition of the phosphor 36 is configured such that the light generated by the phosphor combined with the portion of blue light 44 that is not absorbed by the phosphor appears white in color and has a selected CCT and constitutes the emission product 46 of the bulb. The light emitting surface can further comprise a pattern 60 of one or more phosphors such as orange light emitting phosphors to enhance the appearance of the flame effect.

It will be appreciated that LED lamps in accordance with the invention are not limited to exemplary embodiments described and that variations can be made within the scope of the invention. For example other optical geometries will be apparent to those skilled in the art. Whilst the light guide has been described as being of circular cross section light guides of other cross sections such as square, rectangular, elliptical or triangular can be used. To maximize the emission of light from the light emitting surface of the light guide, the light emitting surface can include a surface texturing to optimize light striking the surface at angles above the critical angle. Such surface texturing can comprise a regular surface patterning such as a series of ridges. Moreover, LED lamps in accordance with the invention can comprise other LEDs such as silicon carbide (SiC), zinc selenide (ZnSe), indium gallium nitride (InGaN), aluminum nitride (AlN) or aluminum gallium nitride (AlGaN) based LED chips that emit blue or U.V. light.

What is claimed is:

1. A lamp comprising:
   a dish-shaped reflector;
   at least one LED operable to generate excitation light;
   a light guide configured to extend along an axis of the reflector, wherein light generated by the at least one LED is coupled into a first end of the light guide and wherein light is emitted from the light guide at a light emitting surface that is in proximity to a second end of the light guide, wherein the light emitting surface tapers outwardly away from the first end of the light guide;
   at least one phosphor material provided as a layer on at least a part of the light emitting surface of the light guide; and
   a light reflective surface on one end of the light emitting surface, wherein the light reflective surface prevents light emission from the second end of the light guide, and is configured to reflect light towards the at least one phosphor material.

2. The lamp of claim 1, wherein the first end of the light guide is located outside of the reflector.

3. The lamp of claim 2, wherein the light emitting surface of the light guide is located within the reflector.

4. The lamp of claim 1, wherein the light emitting surface comprises a generally frusto-conical surface, with the truncated apex of the cone located at the end of the light guide.

5. The lamp of claim 4, wherein the light reflective surface is located on the base of the frusto-conical surface.

6. The lamp of claim 5, and further comprising a generally conical indentation in the base of the frusto-conical surface.

7. The lamp of claim 1, and further comprising a light reflective surface on an outer surface of the light guide.

8. The lamp of claim 1, and further comprising a thermally conductive body and wherein the at least one LED is in thermal communication with the body.

9. The lamp of claim 8, wherein the body is generally frusto-conical in form.

10. The lamp of claim 9, wherein the body is configured such that the spotlight can be fitted in an existing lighting fixture.

11. The lamp of claim 10, wherein the body is configured such that it has a form factor that resembles a standard form selected from the group consisting of: MR16, MR11, PAR20, PAR30, PAR38, PAR56 and PAR64.

12. The lamp of claim 8, wherein the body has a thermal conductivity selected from the group consisting of at least 150 $Wm^{-1}K^{-1}$ and at least 200 $Wm^{-1}K^{-1}$.

13. The lamp of claim 12, wherein the body comprises a material selected from the group consisting of: a metal core printed circuit board, aluminum, an alloy of aluminum, a magnesium alloy, copper and a thermally conductive ceramic material.

14. The lamp of claim 8, wherein the body further comprises a plurality of heat radiating fins.

15. The lamp of claim 1, wherein the dish-shaped reflector comprises a light reflective surface that is generally parabolic.

16. The lamp of claim 1, wherein the dish-shaped reflector is selected from the group consisting of: Acrylonitrile Butadiene Styrene, a polycarbonate, an acrylate, polymer material, aluminum, an aluminum alloy and a magnesium alloy.

* * * * *